United States Patent
Chen

(10) Patent No.: US 7,127,172 B1
(45) Date of Patent: Oct. 24, 2006

(54) OPTICAL FREQUENCY FILTER

(75) Inventor: Jerry C Chen, Arlington, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/324,253

(22) Filed: Jun. 2, 1999

(51) Int. Cl.
*H04J 14/02* (2006.01)

(52) U.S. Cl. ............. 398/85; 359/723; 359/885

(58) Field of Classification Search ............. 359/173, 359/124, 182, 723, 885; 341/13; 385/24; 379/56.1, 56.2, 56.3; 398/85
See application file for complete search history.

(56) References Cited

U.S. PATENT DOCUMENTS

| | | | | |
|---|---|---|---|---|
| 3,766,392 A | * | 10/1973 | Nelson et al. | 340/870.29 |
| 4,746,193 A | | 5/1988 | Heritage et al. | 350/162.12 |
| 4,805,235 A | | 2/1989 | Henmi | 455/608 |
| 4,866,699 A | | 9/1989 | Brackett et al. | 370/3 |
| 4,928,316 A | | 5/1990 | Heritage et al. | 455/600 |
| 5,002,350 A | | 3/1991 | Dragone | 350/96.15 |
| 5,042,086 A | | 8/1991 | Cole et al. | 455/606 |
| 5,134,509 A | | 7/1992 | Olshansky et al. | 359/132 |
| 5,136,671 A | | 8/1992 | Dragone | 385/45 |
| 5,166,818 A | | 11/1992 | Chase et al. | 359/170 |
| 5,173,790 A | * | 12/1992 | Montgomery | 359/306 |
| 5,317,384 A | | 5/1994 | King | 356/351 |
| 5,329,118 A | * | 7/1994 | Riza | 250/227.12 |
| 5,329,398 A | | 7/1994 | Lai et al. | 359/566 |
| 5,359,412 A | | 10/1994 | Schulz | 356/345 |
| 5,359,449 A | | 10/1994 | Nishimoto et al. | 359/181 |
| 5,373,389 A | | 12/1994 | Huber | 359/195 |
| 5,379,310 A | * | 1/1995 | Papen et al. | 372/23 |
| 5,414,540 A | * | 5/1995 | Patel et al. | 349/196 |
| 5,414,548 A | | 5/1995 | Tachikawa et al. | 359/130 |
| 5,493,426 A | * | 2/1996 | Johnson et al. | 349/74 |
| 5,541,755 A | | 7/1996 | Noe et al. | 359/110 |
| 5,602,677 A | | 2/1997 | Tournois | 359/566 |
| 5,689,361 A | | 11/1997 | Damen et al. | 359/284 |
| 5,745,616 A | | 4/1998 | Zirngibl | 385/37 |
| 5,793,907 A | * | 8/1998 | Jalali et al. | 359/130 |
| 5,870,216 A | * | 2/1999 | Brock et al. | 398/49 |
| 5,881,199 A | | 3/1999 | Li | 385/140 |
| 5,889,906 A | | 3/1999 | Chen | 385/28 |
| 6,021,242 A | * | 2/2000 | Harumoto et al. | 385/27 |

(Continued)

FOREIGN PATENT DOCUMENTS

EP 0 503 512 A2 9/1992

OTHER PUBLICATIONS

M. Zirngibl and C.H. Joyner, "High Performance, 12 frequency optical multichannel controller," *Electronics Letter*, 30 (9): 700-701 (1994).

(Continued)

*Primary Examiner*—David C. Payne
(74) *Attorney, Agent, or Firm*—Weingarten, Schurgin, Gagnebin & Lebovici LLP

(57) ABSTRACT

The present invention relates to an optical signal shaping device such as an optical filter having a profile such that transmission of light through the device varies as a function of frequency over a selected bandwidth. The optical signal shaping device of the present invention includes a frequency dependent disperser that disperses the input optical signal to form a dispersed signal having a plurality of frequencies, a frequency selective modulator that modulates at least one of the plurality of frequencies and a frequency dependent combiner that combines the frequencies to form a modulated output signal.

32 Claims, 15 Drawing Sheets

U.S. PATENT DOCUMENTS 6,054,938 A * 4/2000 Nakajima et al. ...... 250/231.13
6,122,419 A * 9/2000 Kurokawa et al. ............ 385/31
6,263,127 B1 * 7/2001 Dragone et al. .............. 385/24
6,282,005 B1 * 8/2001 Thompson et al. ......... 398/143

OTHER PUBLICATIONS

C.R. Doerr, "Proposed WDM Cross Connect Using a Planar Arrangement of Waveguide Grating Routers and Phase Shifters," *IEEE Photonics Technology Letters*, 10 (4): 528-530 (1998).

* cited by examiner

OPTICAL FREQUENCY FILTER

GOVERNMENT SUPPORT

The invention was supported, in whole or in part, by a grant F19628-95-C-0002 from the Air Force. The Government has certain rights in the invention.

BACKGROUND OF THE INVENTION

Because of the large inherent bandwidth of optical systems, such systems are being increasingly utilized for transmitting information, generally over fiber optic cables, in telephone, cable television, data transmission and processing and other applications. Heretofore, such systems have typically used amplitude modulation (AM) because it is simple to implement. However, frequency modulation (FM) is more power efficient as compared with amplitude modulation and can provide an order of magnitude or more increase in signal-to-noise ratio. While this signal-to-noise ratio advantage has been taken advantage of for many years in radio, FM is not widely employed to any extent in optical communications. Thus, even though wireless transmission encodes signals via FM because FM offers substantial power savings over AM, optical transmission tends towards AM because component technology for FM receivers and sources is limited.

For analog communication or communication involving a multiplicity of discrete optical frequency levels, where noise may present problems, current optical frequency discriminators are typically non-linear and have been found to provide linearity over only such a short frequency range that it is difficult to obtain distortion free outputs over a useful range of modulating frequencies. The lack of an optical frequency discriminator which provides a substantially linear output over an extended frequency range still presents a problem.

A need therefore exists for an improved frequency discriminator for use in optical FM communication systems and other applications, which provides a substantially linear output over a selected bandwidth.

SUMMARY OF THE INVENTION

According to the present invention, an optical signal shaping device such as an optical filter having a profile such that transmission of light through the shaping device is modulated as an increasing or decreasing function of frequency over a selected bandwidth. The optical signal shaping device of the present invention is used to transmit continuous wave light having a range of frequencies or pulsed data. In a preferred embodiment of the invention, the optical frequency filter includes a frequency dependent disperser that disperses an input optical signal to form a dispersed signal having a plurality of frequencies. The plurality of frequencies are mapped to different positions, angles, polarizations, time delays, etc. A frequency selective modulator then modulates at least one of the plurality of frequencies and a frequency dependent combiner combines the frequencies to form an intensity modulated output signal.

In a preferred embodiment, a device that allows light to propagate in a predetermined direction such as a circulator is optically coupled to an input optical waveguide and the disperser. The frequency dependent disperser includes a device having time delays which depend on frequency. The disperser comprises a fiber grating having a Bragg frequency that is an exponential function of position. The modulator and combiner may include a grating.

In another preferred embodiment the frequency dependent disperser includes a diffraction grating. In yet another embodiment the frequency dependent disperser includes a prism. In the alternative, the disperser is formed from an arrayed waveguide grating (AWG), or a waveguide grating router (WGR).

According to another preferred embodiment of the present invention, an FM to intensity modulation (IM) converter having a profile such that the transmitted of light is linear with respect to frequency over a selected bandwidth. The converter includes a frequency dependent disperser for dispersing an input optical signal to a dispersed signal having a plurality of frequencies; a frequency selective modulator that modulates at least one of the plurality of frequencies and a frequency dependent combiner that combines the frequencies to form a modulated output signal.

According to another preferred embodiment of the present invention, a method to shape the transmission of a signal with respect to frequency includes the steps of dispersing an input optical signal using a frequency dependent disperser to form a dispersed signal having a plurality of frequencies; modulating the optical signal using a frequency selective modulator that modulates at least one of the plurality of frequencies and combining the optical signal using a frequency dependent combiner to form an output signal that is linear with frequency over a selected bandwidth.

The optical filter of the present invention has applicability in optical communication systems, spectroscopy, analog communication systems such as cellular communication, cable TV, radar, etc. The invention can be used as a filter along one or more optical paths in all of these applications, for example.

The above and other features and advantages of the invention, including various novel details of construction and combinations of parts will now be more particularly described with reference to the accompanying drawings and pointed out in the claims. The following more particular description of preferred embodiments of the invention, are illustrated in the accompanying drawings in which like reference characters refer to the same parts throughout the different views. The drawings are not necessarily to scale, emphasis instead being placed upon illustrating the principles of the invention. It will be understood that the particular system embodying the invention is shown by way of illustration and not as a limitation of the invention.

DETAILED DESCRIPTION OF THE INVENTION

Figure 1:
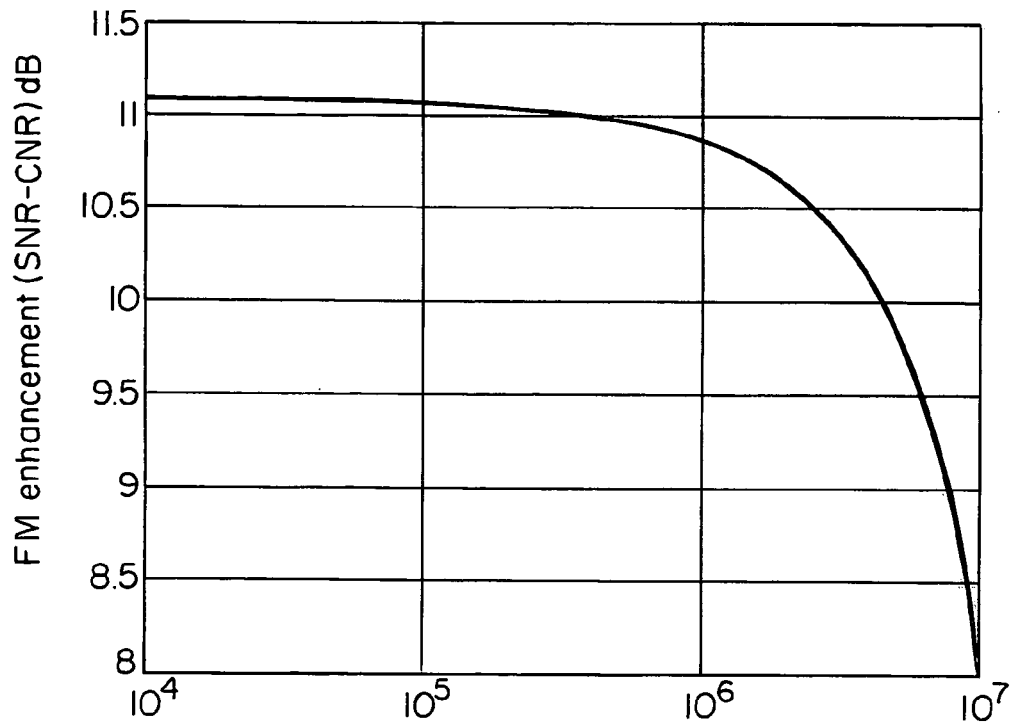
FIG. 1 is a graphical illustration of the FM enhancement factor (SNR-CNR) as a function of transmitter linewidth.

The present invention is directed to an optical frequency filter having a profile such that transmission of light through the filter increases or decreases as a function of frequency over a selected bandwidth in a preferred embodiment, the transmission of light is linear as a function of frequency over a selected bandwidth.

It is desired that analog communication systems transmit, without appreciable degradation, time varying information, whether it be voice, data, video, etc. This time varying information can be represented by an electrical or RF voltage. The communication link employed by the analog communication systems uses light, which can handle large bandwidths over long distances.

Metrics for strength and fidelity that may be employed are signal to noise ratio (SNR) and dynamic range (DR). The SNR compares the signal power with the random noise or background fluctuations. The dynamic range measures the linearity of the signal. It is the ratio of the linear signal and the nonlinear distortions. If users want to keep the noise and nonlinearities below 0.1% of the signal power, then the SNR and DR are both 30 dB. If the signal has a 1 GHz bandwidth, the SNR can be alternatively expressed as 120 dB·Hz and the DR as 90 dB·Hz$^{2/3}$.

Analog information can be transmitted either as analog information on or in a different form. It can be converted to digital information and be transmitted digitally, then be reconverted back to analog information. For example, phone companies employ this methodology to transmit voice over long distances. Voice has 4 kHz of bandwidth. Per the Nyquist criterion, the sampling rate must be at least twice the bandwidth, or in this case, 8 kHz. The analog signals are converted into 8 bits of resolution, for a total throughput of 64 kb/s. If a SNR of 30 dB for a 1 GHz bandwidth signal is desired, the sample rate is 2 GS/s (gigasamples per second). Analog-to-digital converters are not readily available commercially for these speeds. If available, the converter would have to output at least 5 bits, because a SNR of 30 dB corresponds to log 30=4.91 bits. The analog signal is equivalent to a 10 Gb/s digital stream. Only recently can a 10 Gb/s fiber optic link on a single wavelength be purchased. Each fiber can support 32 wavelengths for a total throughput of 320 Gb/s. Thus, transmission rates over fiber are limited by analog-to-digital converter technology.

Because of the substantial power savings, FM is the preferred format for communication systems such as satellite downlinks. The long distances associated with these downlinks mean large propagation losses. For example, television broadcasts from satellites to dishes use FM. In addition, some proposed fiber based video links also employ FM, because of the large optical losses associated with splitting the power among hundreds of subscribers and receivers. Radio listeners prefer the FM band. However, optical transmission is predominantly AM because component technology for FM receivers and sources is limited.

Because FM systems use frequency to differentiate between various signals, it is important to have sources with narrow, well-defined frequencies. A source with large linewidths adds noise. Referring to, FIG. 1 the effect of linewidth on the signal to noise ratio is illustrated. In this illustration, the signal to noise ratio is SNR=30 dB; FM deviation is $\beta_f=3$; baseband bandwidth B=1 GHz. To keep the power degradation below a half a dB, the linewidth needs to be below 2.5 MHZ.

It is known that the linewidth depends on the photon lifetime in the laser cavity and optical gain. In turn, this depends on the threshold carrier density, mirror loss, and spontaneous emission lifetime. Further, the linewidth scales as $(1+\alpha)^2$ where $\alpha$ is defined as the alpha parameter or linewidth enhancement factor which is related to the ratio of change in the imaginary part of the index of refraction to the change in the real part of the index of refraction. Lasers with low a's are preferred. The linewidth can be further reduced with quarter wave shifted gratings. These resonant cavities can reduce linewidths to 135 KHz. The linewidth can also be reduced by long external cavities, whose lengths are limited by scattering and propagation losses. Subkilohertz linewidth with a 10 cm long cavity have been obtained.

Figure 2:
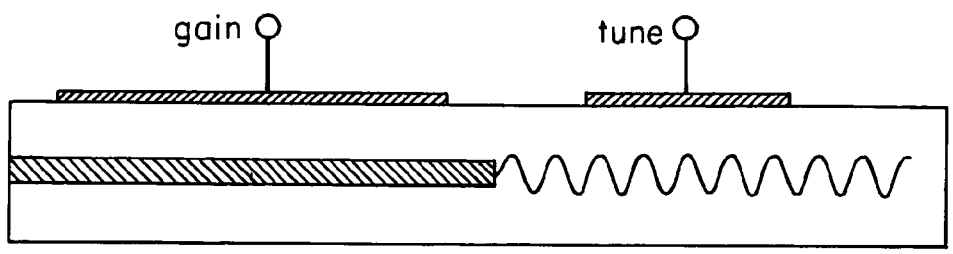
FIG. 2 is a schematic drawing of a grating based laser.

Referring to FIG. 2, a Distributed Bragg Reflector (DBR) laser is illustrated. The left section of the laser is the gain material, which amplifies the optical light. The right half is a Bragg mirror, which reflects only a single frequency $f=c/2n\Lambda$; where c is the speed of light in vacuum; n is the index of refraction and $\Lambda$ is the grating period or unit cell. An electrode can be attached to the grating so electrical current can excite carriers and change the optical properties of the grating. Specifically, the index n can be varied as much as a percent. It is difficult to modulate the carrier densities faster than the carrier lifetime, so the generation of FM signals in the gigahertz region is challenging.

Electro-absorption is a potential candidate for changing the index of refraction (both real and imaginary parts) quickly. Electro-absorption modulators work up to approximately 40 GHz. Gratings with 56 picosecond tuning and with only 5% residual AM have been achieved. Grating based sources give pure FM signals with minimal AM noise, but high-speed operation is challenging.

Indirect modulation is a common way to generate frequency modulation in wireless or radio applications. This involves feeding the integral of the RF input to a phase modulator. A narrowband, optical version with a megahertz bandwidth has been demonstrated. A methodology for achieving larger frequency modulations includes the following: the optical frequency is $$f = j\omega\phi = j\omega\frac{\pi}{V_\pi}V_{out},$$

where ω is the optical carrier frequency, $V_{out}$ is the RF voltage exiting the integrator, and $V_\pi$ is the modulator voltage needed for π phase shift. An ideal integrator can be characterized by $$V_{out} = \frac{1}{j\omega}V_{in} \text{ so}$$

the frequency is linear with voltage $$f = \frac{\pi}{V_\pi}V_{in}.$$

Figure 3:
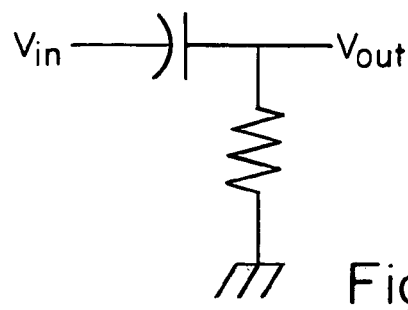
FIG. 3 is a schematic diagram of an electronic integrator formed from discrete circuit elements.

In practice, integrators are formed with a voltage divider. Referring to FIG. 3, a lumped element version is illustrated. This circuit can be characterized by $$\frac{V_{out}}{V_{in}} = \frac{\frac{1}{j\omega C}}{R + \frac{1}{j\omega C}},$$

where R is the resistance, C is the capacitance, and ω is the RF frequency. In turn, the change in optical frequency is $$f = \frac{\pi}{V_\pi}\frac{V_{in}}{RC + \frac{1}{j\omega}}.$$

The integrator works only when jω>RC. Let's set jw==m/RC, where m>1. A good value for m is 2 or 3 because the frequency is immune from the 3 dB roll-off and the insertion loss for the RF signal is low. Integrators can be built with 20 GHz bandwidths when made from distributed elements.

Indirect modulation achieves FM without spurious intensity fluctuations. However, it is not as scalable to high bandwidths as tunable lasers or direct modulation. Direct modulation suffers from sizeable amplitude noise. Tunable lasers are currently limited by non-linear effects. In particular, it is difficult to change frequency while keeping the intensity constant.

Frequency deviations can be detected coherently or incoherently. Coherent techniques, such as homodyne and heterodyne, are difficult to implement, but require little received power. Incoherent methods, which use frequency filters and direct detection, can use commercially available direct detection sub-systems.

Incoherent systems use direct detection, which as on-off keying is used extensively in the commercial digital realm. Unfortunately, direct detection is mainly sensitive to power fluctuations, not frequency changes. There are at least two methods for incoherent detection. One method includes changing the source so that the modulation of the optical power occurs at the RF frequency. This modulation can be achieved by using a voltage controlled oscillator to drive the laser. In the alternative, a heterodyne detector at the source can be used to provide the FM transmitter. Because light can then be detected using a standard incoherent detector which converts light to RF, the RF signals are converted from FM to AM via an electrical delay and multiply discriminator (DAMD). The bandwidth of this DAMD is limited by the speed of currently available digital logic gates, which is approximately 6 GHz.

Figure 4:
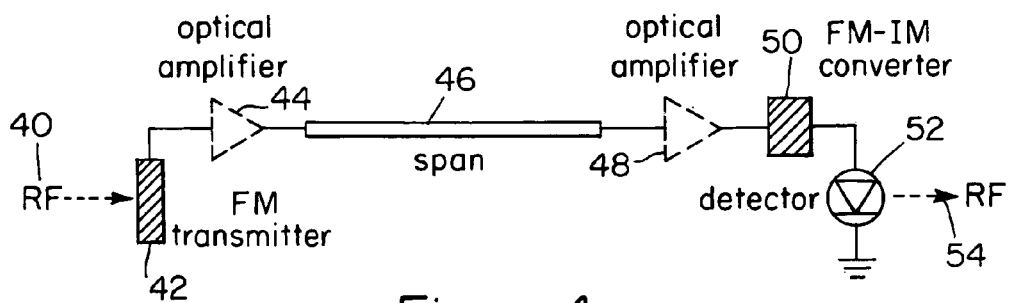
FIG. 4 is a schematic diagram of an FM communication system with an optical frequency filter in accordance with the present invention.

In accordance with the present invention, another method to encode frequency information in intensity variation is to convert the optical FM to optical intensity modulation (IM), using an optical frequency filter. Intensity is a measure of power or more particularly the square of the magnitude of the electrical or magnetic field. The resulting IM can be detected normally. Referring to FIG. 4, a sample analog communication system is illustrated. The RF input 40 drives an FM transmitter source 42. The optical signals then are amplified if required, by the optical amplifier 44. The optical signals then cross the span 46 which may either include fiber or free space links. If span 46 is a free space link, the optical beam spreads. Beam spreading is minimized by using a telescope or a lens system to focus the optical beam. The lens system may accommodate either the movement of the source or the detector. The optical signals are then amplified, if required by the optical amplifier 48 and form an input into the FM to IM converter 50 in accordance with the present invention. The IM output is then detected by detector 52. The resultant IM output of the analog communication system is an RF signal 54.

Figure 5:
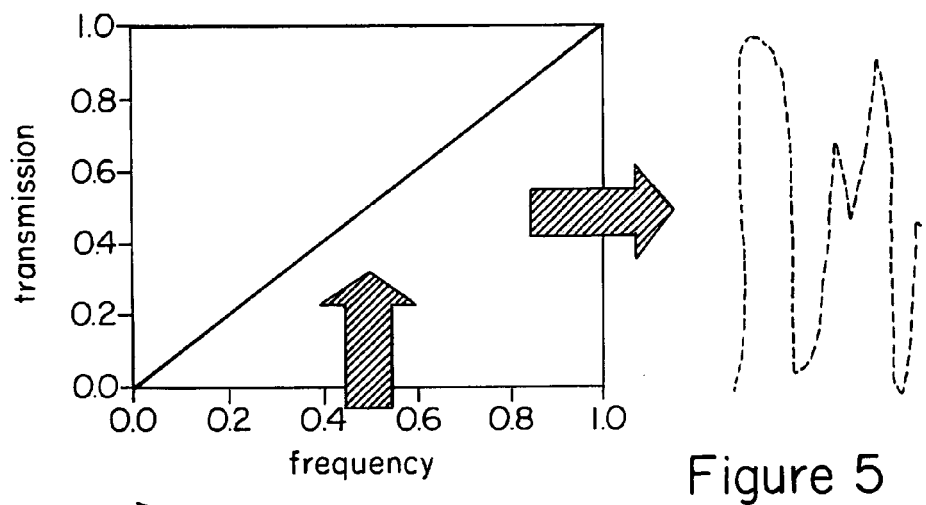
FIG. 5 is a graphical illustration of the transmission of light as a function of frequency for the optical frequency filter in accordance with the present invention.

Referring to FIG. 5, this example of an ideal frequency filter has a linear transmission profile with respect to frequency. Because the baseband frequency range (1 GHz) is a small part of the optical carrier (200 THz), it is difficult to find an optical filter. In the past, others have used Fabry Perot resonators and Mach Zehnder interferometers, which are highly nonlinear. The distortion can be kept at an acceptable level by using only a small fraction of the Free Spectral Range (FSR), where the distortion is minimal. The bias point means the direct current (DC) component of the transmitted power is small so less noise is propagated. In general, the alternating current (AC) component is very small and so requires a sensitive receiver.

Relative intensity noise (RIN) and amplified spontaneous emission noise multiplied with the optical signal, scale with optical power. As it is desired that most of the optical power carries information, the continuous wave (CW) carrier needs to be suppressed. Mach Zehnder and Fabry Perot discriminators can suppress the continuous wave (CW) carrier, but these devices are inherently nonlinear and the signal power sees a sizeable insertion loss. On the contrary, the optical filter in accordance with the present invention synthesizes an optical filter that has near unity modulation indices and substantially reduced insertion losses. Thus, even though the optical filter of the present invention is linear over a desired operating range of frequencies, certain non-linearities can be introduced during fabrication processes.

The transmission of an optical signal through the device of the present invention is an increasing or decreasing function with respect to frequency over a selected bandwidth. A user can select or define different increasing or decreasing functions and thus can synthesize different functions. For the optical shaping device of the present invention which includes a prism, diffraction grating, or WGR, the transmitted power versus frequency T(f) is the product of D(f)M(x(f)D(f), where D(f) is the transmission versus frequency of the disperser (for ideal disperser D(f)=1 or some constant independent of frequency) and M(x) is the modulation transmission as a function of x where x is the angle or position or the like. In turn, x=x(f) is a function of frequency. The exact nature of the function x(f) depends on the disperser.

If we want an arbitrary T(f), the modulation function $M(x)=T(f)/D^2(f)$, where f=f(x) comes from inverting x=x(f). For example, if the disperser is linear so $x(f)=Lf/\Delta f$, where 0<X<L, 0<f<$\Delta f$, and D(f)=d. Then, if an arbitrary T(f) is desired the modulation function is $M(x)=T(f=\Delta fx/L)/d^2$.

For a time dependent transmission profile (as in a switch or modulator), the transmission is T(f,t). Because D(f)M(x(f) t)D(f), the desired modulation function is time dependent $M(x,t)=T(f,t)/D^2$ (f), where f=f(x) is the same as before.

For a fiber grating and the like, $T(f)=D^2(f)\exp(2\int_0^L g(x) dx)$ where x=x(f) is the function describing how the position along the grating is associated with a given Bragg frequency. The function g(x) is the modulator function as a function of position x inside grating (g>0 for gain and g<0 for loss). As before, D(f) is the frequency dependent transmission of light through the disperser. In the case of the shaper involving a fiber grating, D accounts for transmission through the fiber grating, circulator, and couplers. An equivalent way of expressing transmission is $T(f)=D^2(f)$ $$\exp\left(2\int_{f_1}^{f_2} g(x(f))\frac{dx}{df}df\right);$$

where o<x<L, $f_1$<f<$f_2$.

If an arbitrary T(f) is desired and we know D(f) and x(f), then g(x) can be calculated, $$g(f) = \frac{\frac{1}{2}\frac{d}{df}\left(\ln\frac{T(f)}{D^2(f)}\right)}{\frac{dx}{df}}$$

is a function of frequency. After substituting into g(f) x=x(f), which is defined by how the Bragg frequency changes with position, g(x) is calculated. For example, to calculate g(x) when $$T(f) = \sin\pi\frac{f}{\Delta f}$$

where 0<x<L and 0<f<$\Delta f$. Let's assume D(f)=1 and x/L=f/$\Delta f$. Then $$g(f) = \frac{\pi}{2L} = \cot\pi\frac{f}{\Delta f}$$

and $$g(x) = \frac{\pi}{2L}\cot\pi\frac{x}{L}.$$

Similarly, if an arbitrary T (f) is desired and D(f) and g(x) are known, then x=x(f) can be calculated. Upon integrating $$\left(\ln\frac{T(f)}{D^2(f)}\right)\bigg|_{f_o}^{f} = \int_{x_0}^{x} g(x)dx$$

to a function of frequency on the lefthand side and a function of x on the righthand side, and solving for x, one calculates x=x(f). Further, $f_0$ and $x_0$ are values where $x_0=x(f_0)$ is known.

Figure 6A:
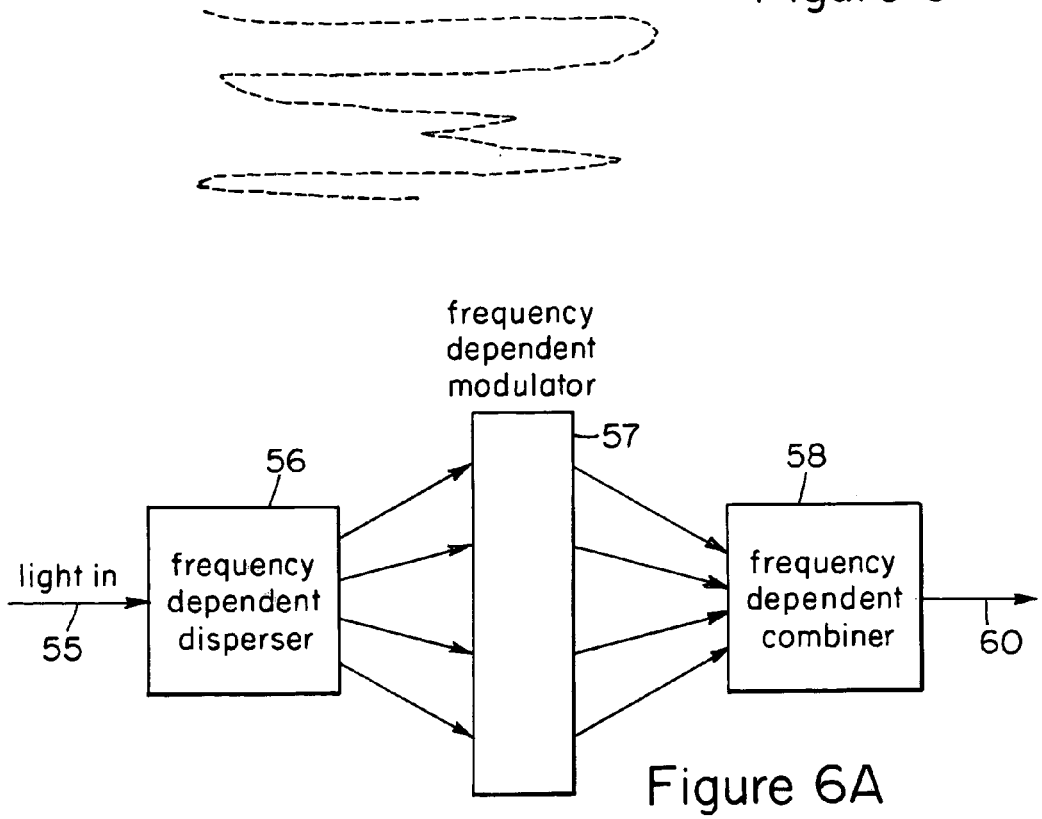
FIGS. 6A–6C are schematic diagrams of the optical frequency filter in accordance with the present invention.
Figure 6B:
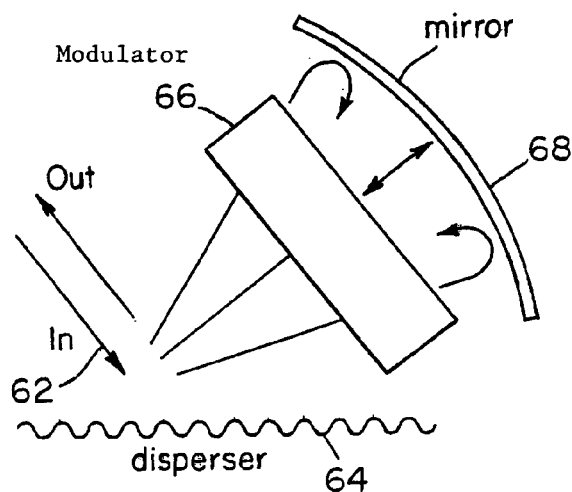
Figure 6C:
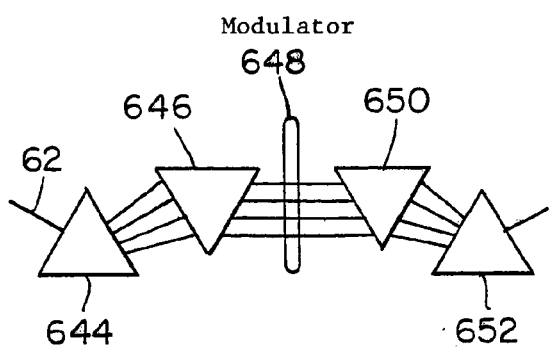

Referring to FIGS. 6A through 6C, schematic illustrations of the optical filter in accordance with the present invention include a frequency dependent disperser, a frequency dependent modulator and frequency dependent combiner. The frequency dependent disperser 56 disperses a frequency modulated light signal 55 into a plurality of frequencies, positions, angles, polarizations, time delays, etc. The frequency selective modulator 57 modulates at least one of the plurality of frequencies and the frequency dependent combiner 58, combines the dispersed and attenuated frequencies to form an intensity modulated output signal 60. Thus, the input optical signal 55 is dispersed so that each frequency is spatially mapped. A spatially dependent loss or gain is created for the dispersed signal components. The dispersed signal is then combined to provide an output optical signal. In particular, FIG. 6B schematically illustrates an embodiment of the optical filter using a mirror. Light input 62 hits a diffraction grating 64, which disperses different frequencies into different angles. The different frequencies arrive at the modulator 66 at different positions along the modulator. The modulator changes the intensity of the light, depending on the light's point of arrival on the modulator. The light is then reflected back by the mirror 68. The light is then modulated again and recollected by the diffraction grating 64. If the mirror is orientated such that the mirror is along the wavefront of the optical beam, the output and input beams are in the same position or location. If the mirror is tilted slightly, the output beam will bounce off the diffraction grating at a slightly different spot and exit at a different position from the input beam. The diffraction grating can be substituted by any device that spreads the different frequencies into different angles. Examples of such devices are prisms and waveguide grating routers.

FIG. 6C schematically illustrates an embodiment of the optical filter that includes prisms to disperse and combine the input and output optical signals respectively. The input light 62 enters from one side of the device. A first prism 644 disperses the light into different angles. A second prism 646 also bends the light such that different angles are mapped to different spatial positions. The net effect of these two prisms (or any device that maps frequencies to angles) is a device that maps frequencies to spatial points or positions. The modulator 648 changes the light's intensity based on the light's position. Two prisms 650, 652 act as a combiner, which collects light from different positions and "funnels" them into one position to create the output signal. FIG. 6C as illustrated is predicated on the fact that the prisms 644, 646, 650 and 652 are in close proximity so that path length differences for different frequencies are small compared to data rate. In an alternate embodiment, the prisms that comprise the disperser 644, 646, and the prisms that comprise the combiner 650, 652 are not in close proximity. The prisms 650, 652 can each be individually rotated 180° so that the path lengths for all frequencies are equal.

One embodiment of the optical filter in accordance with the present invention uses fiber gratings. Recently, such gratings are fabricated widely and are commercially available. They flatten gain spectrums of Erbium doped fiber amplifiers, stabilize and monitor wavelengths, add/drop/mux/demux/wavelength channels, and compensate for dispersion. Fiber gratings are commonly modeled by coupled mode theory. Sinusoidal perturbation in index couples forward and backward propagating waves. When the grating period varies, the grating can be subdivided into many piece-wise constant sections and approximated using piece-wise constant approximation.

Gratings can be formed with semiconductor material, for example a chip, with an optional detector formed on the same semiconductor material. By changing the doping profile, the index of refraction of the gratings can be altered. For example, directing ultraviolet (UV) radiation on germanium doped silica with hydrogen loading causes a change in the index of refraction. The fiber grating can be chirped by bending the waveguide or by varying the UV radiation exposure or by charging the grating period. Methods of fabrication and application of fiber gratings are discussed in R. Kashyap, Fiber Bragg Gratings, Academic Press 1999, and Rogers J. A. et. al., Distributed On-Fiber Thin Film Heaters for Bragg Gratings with Adjustable Chirp, Applied Physics Letter, Vol. 74, no. 21, 24 May 1999, pages 3131–3, the entire contents of which are incorporated herein by reference.

Figure 7:
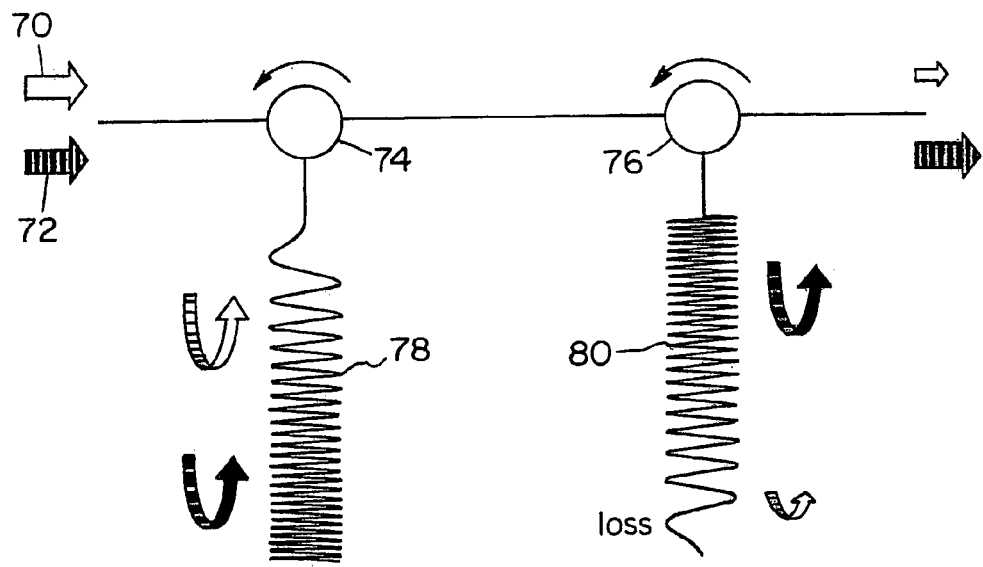
FIG. 7 is a schematic diagram of the optical frequency filter in accordance with the present invention.

Referring to FIG. 7, the FM to IM converter, or optical frequency filter in accordance with the present invention is illustrated. In particular, it describes the passage of two signals with different frequencies (70 and 72). The circles denote circulators 74, 76, which permit the light to travel in only one direction. Circulators 74, 76 can be combined to form a single, four-port circulator. The wavy structures are gratings 78, 80 whose frequency varies spatially. The preferred embodiment of the present invention includes a fiber grating whose Bragg frequency is an exponential function of position. The time delay of the reflected light depends on frequency. In the left grating 78, the pulse 72 travels deeper into the grating 78 so the time delay increases with frequency. This tends to smear out or chirp the frequency spectrum. The second grating 80 is oriented in the opposite direction, leading to an opposite time delay. The chirp is canceled out. However, if we introduce loss into one grating (for example, the second one 80), we can attenuate the light 70 more because it travels a longer distance into the fiber. This frequency selective attenuation forms the basis of a frequency filter. The advantage of this filter is that one can make a filter whose frequency range is very narrow (by chirping the grating period very slightly). Also, one can synthesize a frequency profile that is tailored to specific shapes and functions.

Figure 8A:
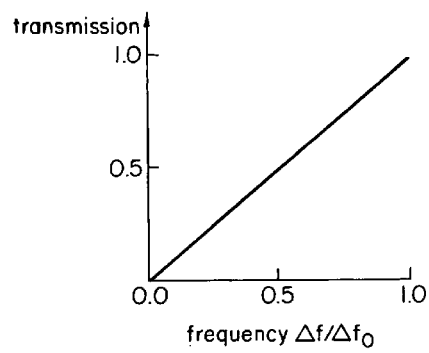
FIGS. 8A and 8B are graphical illustrations of the transmission of light through an embodiment of the optical filter of the present invention which includes a logarithmic chirp grating.
Figure 8B:
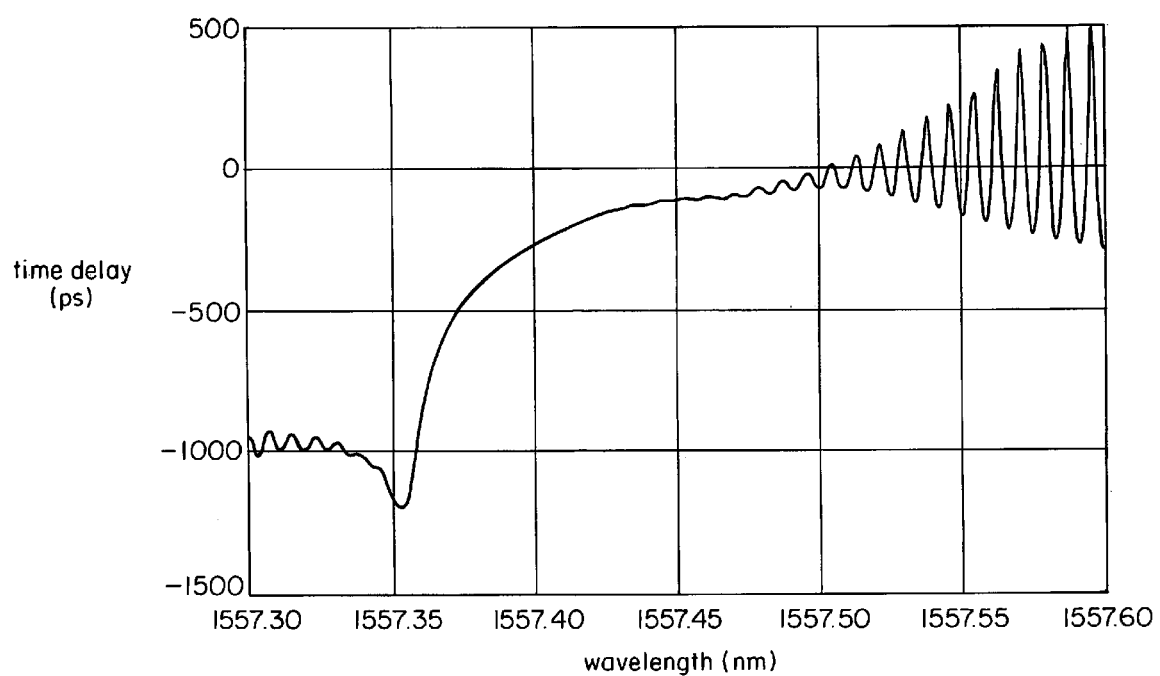

For FM to IM conversion, it is preferable to have a profile in which transmission is linear with respect to frequency. There are several ways to achieve this profile. Referring to FIGS. 8A and 8B, one method may use a grating whose time delay varies exponentially with frequency and a loss whose coefficient is constant. The grating has a substantially logarithmic frequency variation with position:

$$\frac{x}{L} = -\ln\frac{\Delta f}{\Delta f_0}$$

and a loss along the fiber is $\alpha(x)=1/(2L)$. These functions are perturbed because transmission versus frequency through the unmodulated grating and the optical circulators may not be constant or flat with frequency. The transmission is characterized as $$T = e^{-2\alpha x} = \frac{\Delta f}{\Delta f_0},$$

where $f_o$ is the frequency band. The ideal transmission assumes zero circulator insertion and fiber coupling losses. The time delay (T) is related to the wavelength (x) by the following equation:

$$T = \frac{x}{c/n}$$

where $c=f\lambda$ where c is speed of light in vacuum, n is the index of refraction of the material, and $\lambda$ is the wavelength of the light. Thus, a grating is created where $$\frac{x}{L} = -\ln\frac{\Delta f}{\Delta f_0}.$$

Figure 9A:
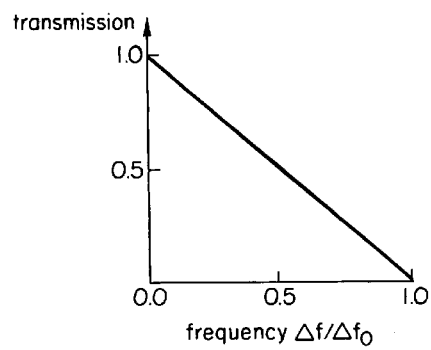
FIGS. 9A and 9B are graphical illustrations of the transmission of light through another embodiment of the optical filter of the present invention which includes a linear chirp grating.
Figure 9B:
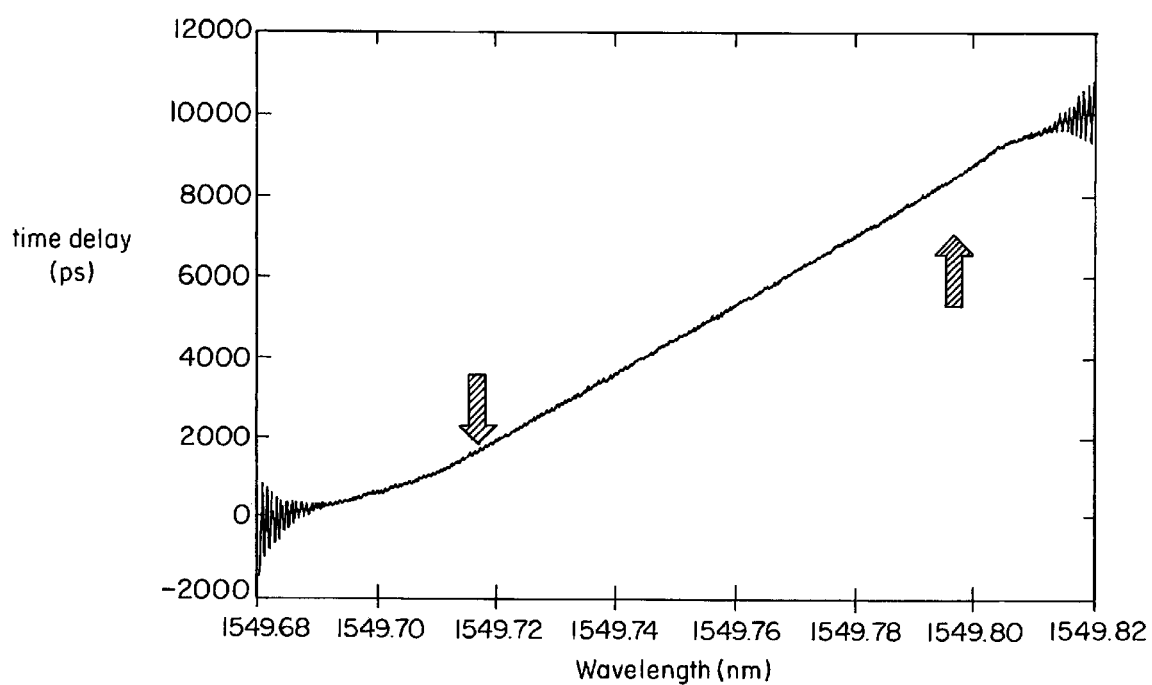

Referring to FIGS. 9A and 9B, another method may use a grating whose time delay is linear with position $\Delta f/\Delta f_0$ x/L but whose loss $\alpha(x)$ is substantially equal to $0.5/(L-x)$ where $0<x<L$ and x is the position and L is the grating length. As discussed hereinabove, these functions are perturbed because transmission versus frequency through the unmodulated grating and the optical circulators may not be constant or flat with frequency. The transmission of light is characterized as:

$$e^{-2\int_0^x \alpha(x)dx} = 1 - \Delta f/\Delta f_0$$

and assumes zero circulator insertion and fiber coupling losses. In particular, FIG. 9B illustrates a linear time delay over approximately 10 GHz.

The aforementioned methods use circulators which are commercially available. Fiber gratings with exponential and linear chirps are also commercially available. Loss can be induced by coupling to other modes such as by bending the waveguide, or by damaging the fiber. The insertion loss of the present invention frequency filter is approximately 2 dB. The circulator is the dominant contributor to the insertion loss.

Figure 10B:
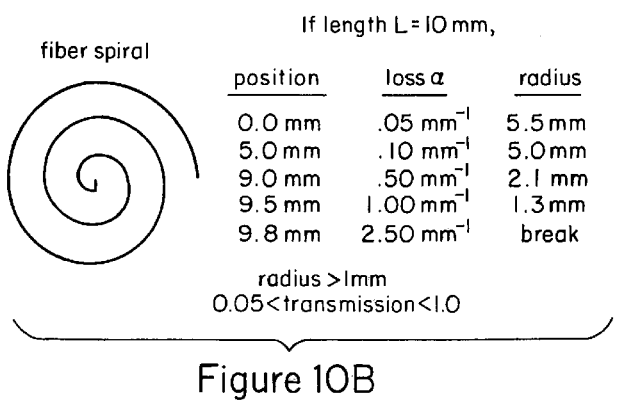
FIGS. 10B and 10C are tabulations of bending loss measurements for different lengths of fiber in accordance with the optical filter of the present invention.
Figure 10C:
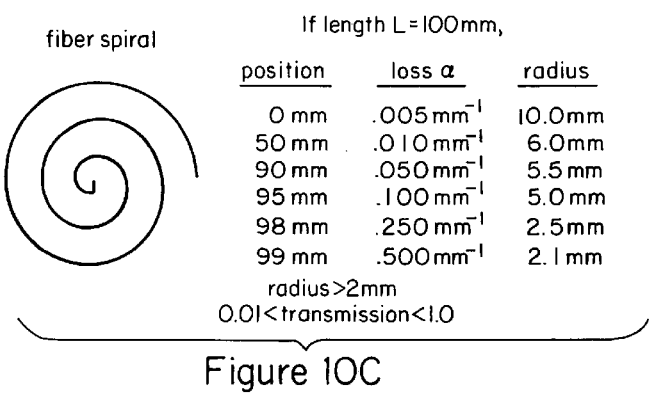
Figure 10A:
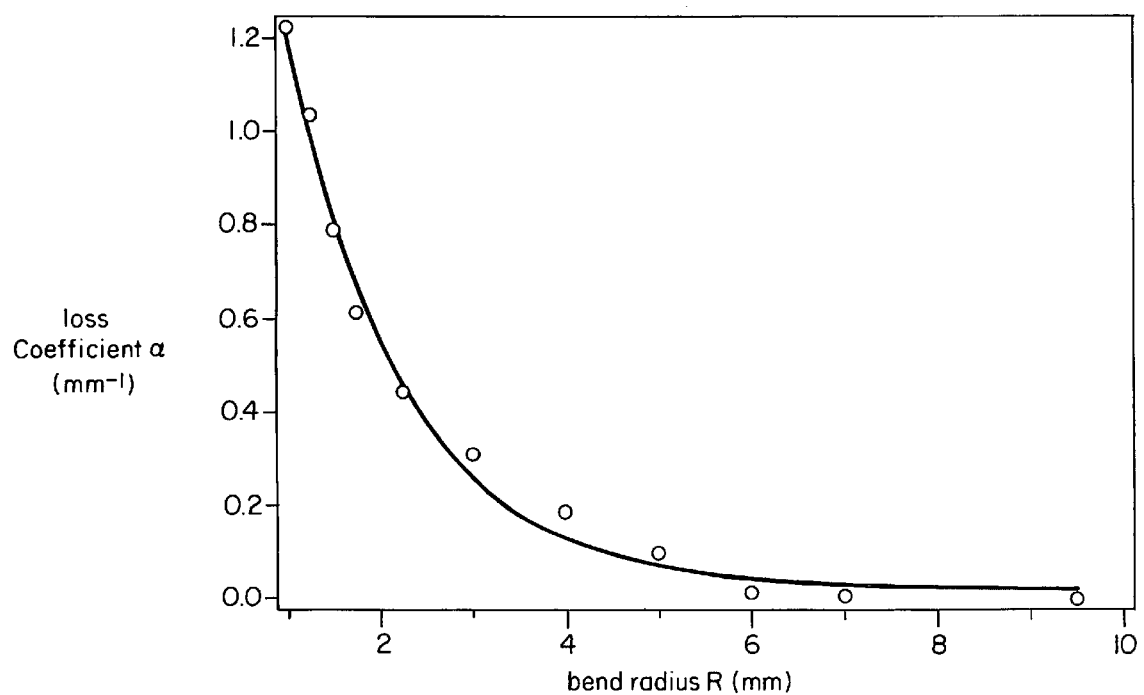
FIG. 10A is a graphical illustration of a bend loss measurement with respect to bend radius in accordance with the optical filter of the present invention.

Another embodiment of the optical frequency filter in accordance with the present invention uses the principle of bending the waveguide to introduce loss. For example, optical fiber can be wrapped to form a fiber spiral using a conical structure or a flat preformed material such as aluminum, plastic, wood for example, the performed materials having grooves so that the fiber is disposed therein. Referring to FIG. 10A a graphical illustration of the bend loss measurement is provided. The loss coefficient that is introduced by the bending of the fiber is a function of the bend radius R of the fiber. Referring to FIGS. 10B and 10C, bending losses are tabulated for different lengths of an optical fiber spiral. In particular, FIG. 10B tabulates the bending losses for a fiber spiral having a length of 10 mm, while FIG. 10C tabulates the bending losses for a fiber spiral having a length of 100 mm.

Figure 11A:
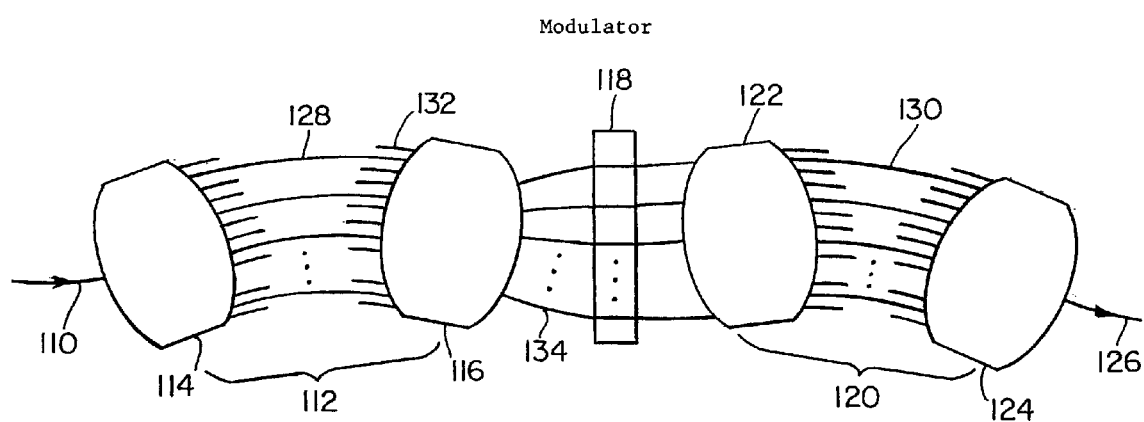
FIGS. 11A and 11B are schematic diagrams of the optical frequency filter in accordance with the present invention including modified waveguide grating routers.

Another embodiment of the present invention uses a modified waveguide grating router (WGR) as the dispersive element instead of a diffraction grating, prism or hologram. WGR is sometimes referred to as arrayed waveguide grating (AWG) or phased array (PA). Referring to FIG. 11A, the present invention can use a plurality of WGRs. The optical input signal 110 forms an input into the WGR 112 formed by elements 114, 116 and 128. The different frequencies of the input optical signal are dispersed into different positions by the WGR 112. The positions depend linearly on frequency. The dispersed signals are then modulated by modulator 118. The modulation may occur by damage to the waveguide, coupling to other waveguide or radiation modes, electroabsorption or Mach Zehnder modulators, etc. Further modulation details are discussed in U.S. Pat. No. 5,881,199, the entire contents of which is incorporated herein by reference. The dispersed optical signal is then combined by the WGR 120 to form the output signal 126. Each WGR 112, 120 includes a first coupler 114, 122, a second coupler 116, 124 and N grating arms 128, 130 interconnecting the first and second couplers. Each coupler 114, 116, 122, 124 include input waveguide arms such as 132 and output waveguide arms such as 134. Output waveguide arms of the first couplers are connected via grating arms to corresponding inputs of the second couplers.

Figure 11B:
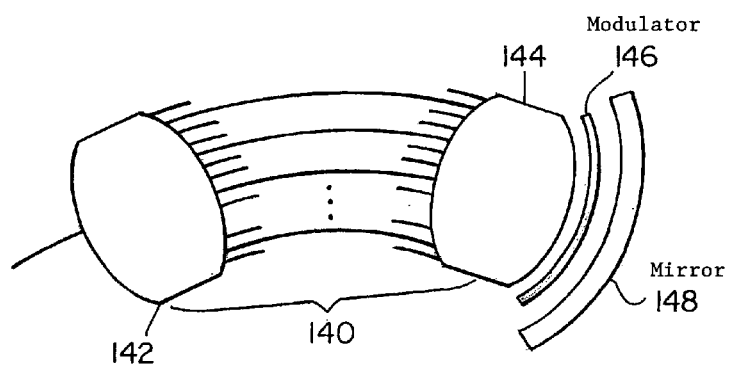

Referring to FIG. 11B, the modified WGR 140 comprising of a first coupler 142, second coupler 144 and waveguides connecting the first and second couplers 142, 144, disperses the different frequencies of the input optical signal into different positions. The positions depend linearly on frequency. The dispersed signals are then modulated by modulator 146. A mirror 148 then reflects back the modulated signal. The output signal uses the input port for transmission out of the optical filter. In another embodiment, the modulated optical signal is incident on a mirror which is oriented at an angle ranging from 0 to five degrees (0–5°). The angle of tilt depends on factors such as the distance of the disperser from the mirror and the size of the disperser itself. The optical signal exits the device using a different port than the input port. This embodiment eliminates the need for a circulator at the input WGR. The mirror may have a modulation element, for example, a neutral intensity filter which can add loss as a function of position. The resulting output signal is offset and then recombined to form the output optical signal. The WGR may be formed with a semiconductor material. The modulator may optionally be formed with the same semiconductor material. Methods for coupling multiple waveguide modes are described in U.S. Pat. Nos. 5,002,350, 5,889,906, 5,745,616, 5,414,548, 5,136,671, 5,881,199, all of which are incorporated herein by reference. Systems and methods described in the above referenced patents can be used with the methods and systems described herein to provide optical communication systems.

Applications or types of analog signals being transmitted by fiber or by free space links that can use the methods and systems of the optical filter of the present invention include cable TV (CATV) video, cellular phone signals and satellite signals. The cable TV video application has a bandwidth which depends on the number of channels. Referring again to FIG. 1, frequency modulation uses bandwidth $2(\beta_f+1)$ $\beta_{Am}$, for a given bandwidth $\beta_f$, and offers about three times more SNR. The AM, (single side band (SSB) or vestigial side band (VSB)) bandwidth ($\beta_{Am}$) is typically 4 MHz per television channel. For example, if $\beta_f=3$, the FM bandwidth is 32 MHz as compared with a 4 MHz AM bandwidth. The system includes the transmission from a source, to a coaxial cable or to a user's setup box. The cellular phone system includes the transmission from antennae to a base station or from one base station to a second base station. A satellite system application has an FM bandwidth of approximately 20 GHz and includes transmission from antennae to a user.

Figure 12A:
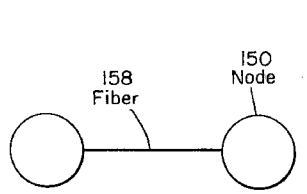
FIGS. 12A and 12B are schematic diagrams of a point to point fiber network including the optical frequency filter in accordance with the present invention.
Figure 12B:
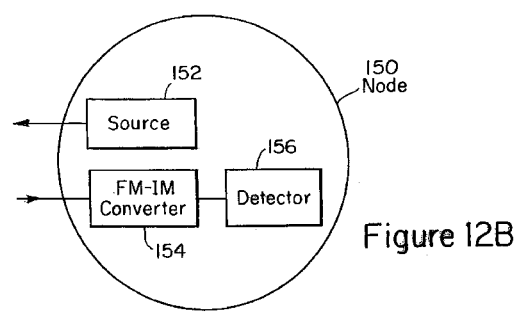
Figure 12C:
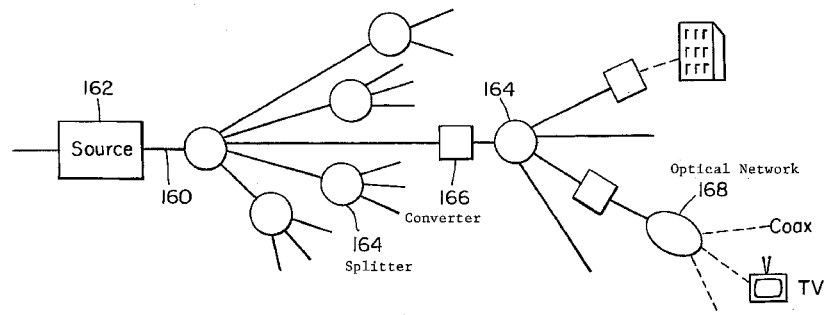
FIG. 12C is a schematic diagram of a tree and branch fiber network such as a cable TV system including the optical frequency filter in accordance with the present invention.

There are a variety of different fiber networks that can be used with the optical filter of the present invention. Referring to FIG. 12A a point to point (from one user to another) is illustrated. Each node 150 or point comprises a source 152, an FM-IM converter 154 in accordance with the present invention and a detector 156. Fiber 158 or free space links connect the nodes 150. Referring to FIG. 12C a tree and branch topology is illustrated. This topology is typically used for a CATV system. The fiber 160 branches out from a source 162 to multiple users from multiple splitters 164. FM to IM converters 166 of the present invention are disposed either prior to or after the splitters. The output signals from the FM-IM converter then form an input into an optical network unit 168 which feeds a TV at a user's house or place of business.

Figure 12D:
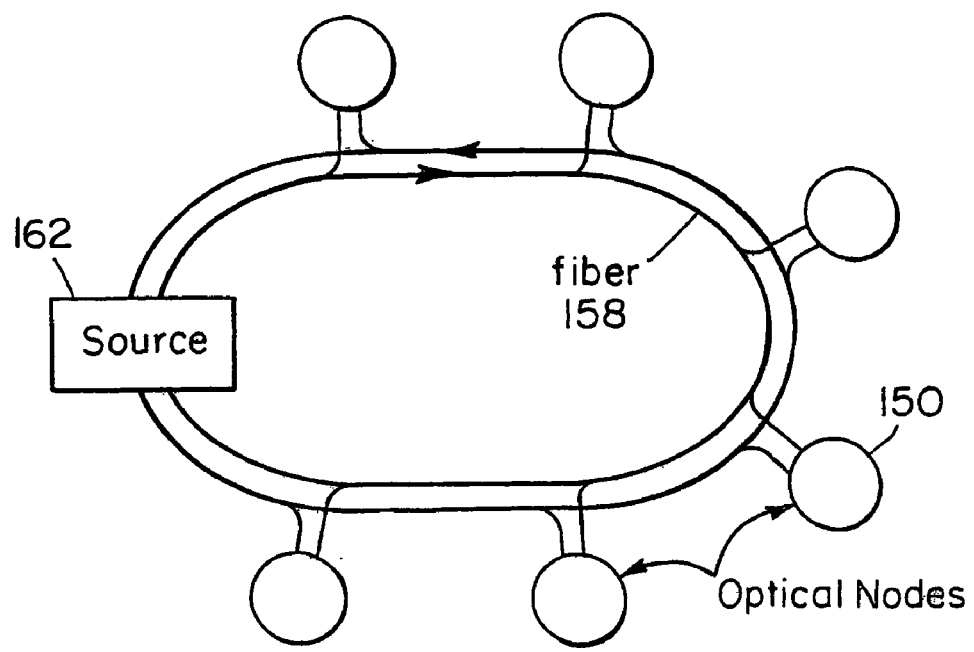
FIG. 12D is a schematic diagram of a ring fiber network including the optical frequency filter in accordance with the present invention.
Figure 12E:
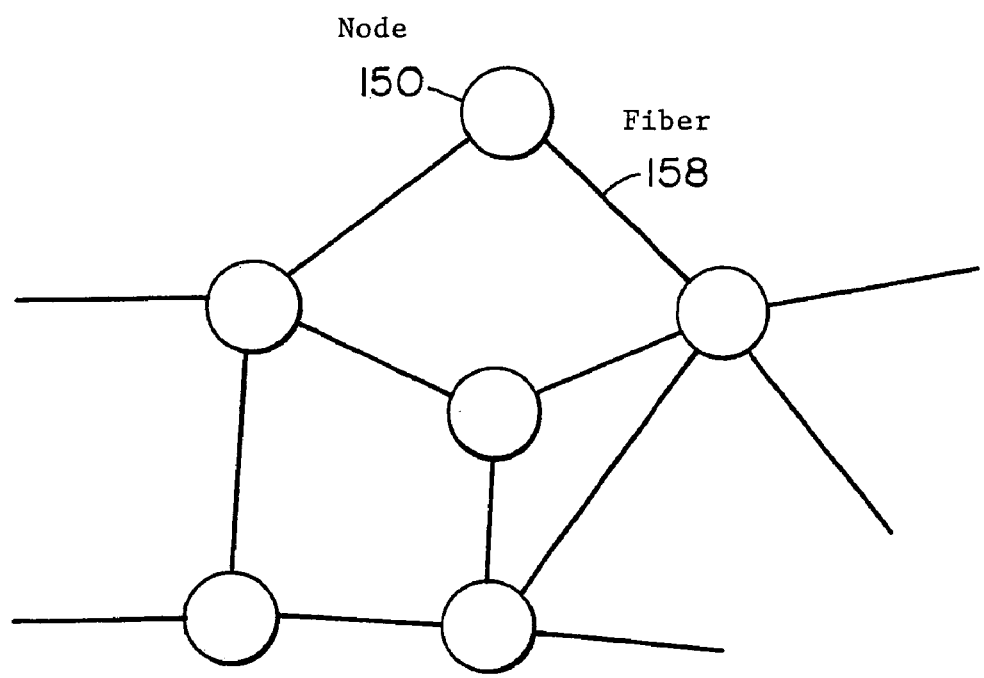
FIG. 12E is a schematic diagram of a mesh fiber network including the optical frequency filter in accordance with the present invention.

Referring to FIGS. 12D, a ring topology is illustrated and is typically used for telephone traffic between cities. As discussed hereinbefore with respect to FIG. 12B, the nodes include the FM-IM converter of the present invention. FIG. 12E illustrates a mesh fiber network. The nodes 150 again include the FM-IM converter of the present invention.

Free space optical transmission is an alternative to RF wireless and a flexible cost effective adjunct to fiber networks. Free space optical offers license free, secure communication over a line-of-sight line. Free space links are generally point to point though they may evolve to other types. Free space links are proposed for satellite to satellite, satellite to ground and building to building communications.

Frequency-modulated (FM) video signals have been used in long-distance CATV and extensively in satellite broadcast systems. From the viewpoint of a multichannel transmission system, FM signals are much easier to transport than amplitude modulation with vestigial sideband (AM-VSB) signals, mainly because of their low carrier-to-noise ration (CNR) requirement. The CNR requirement of an AM-VSB signal is approximately equal to its SNR and can be as high as 43–53 dB, whereas the CNR requirement of an FM video signal can be as low as 9–17 dB, depending on the applied frequency deviation. The relation of CNR and SNR of an FM video signal is $$SNR=CNR+10 \log(3m_f^2(1+m_f))+W+P$$

where $m_f$ is the FM modulation index given by $\Delta f_{peak}/f_v$, $\Delta f_{peak}$ is the peak deviation (typically 10.75 MHz), $f_v$ is the maximum video modulating frequency (4.2 z for the national television standard committee (NTSC)); W is the weighting factor used to account for the nonuniform response of the eye to white noise in the video bandwidth, and P is the preemphasis factor. The overall improvements in SNR over CNR range is from 36.5 to 44.5 dB in a typical satellite network TV. Therefore, if a 53-dB SNR is required at the receiver end, the required CNR can be as low as 8.5 to 16.5 dB, which is much lower than that of an AM-VSB video signal. The improvement may be lower for terrestrial FM optical fiber trunks depending on the applied frequency deviation, W, and P factors.

Multichannel FM video signals are much easier to transport than multichannel AM video signals, but there are currently very few newly installed multichannel FM video optical links. This is due to the incompatibility of FM video signals with a typical NTSC TV set (because an FM demodulator is required at a residence). The FM to IM converter of the present invention can be installed upstream from or at the user interface and facilitate the use of FM video signals.

Most of the noise components in a CATV distribution system are from trunk amplifiers, and most of the nonlinear distortions are generated from bridging and line-extender amplifiers. Therefore, the received video signal quality can be significantly improved if these amplifiers can be replaced by optical fiber links, which have superior system performance in terms of SNR and linearity.

Figure 13A:
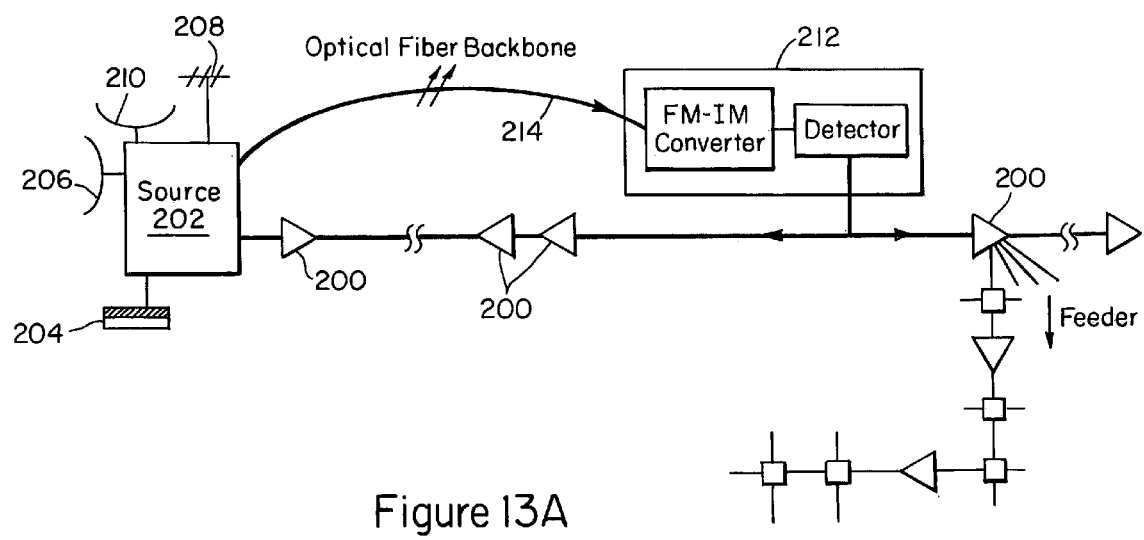
FIGS. 13A through 13D are schematic diagrams of optical fiber systems having different topologies.

The deployment of deeply penetrated optical fibers cannot be achieved in a short period of time, for economic reasons, it must be done stage by stage. The following architectures illustrate the processes of optical fiber deployment. Referring to Figure 13A, the first one is fiber-backbone, whose purpose is to divide the network into smaller service zones and in the same time reuse the existing trunk amplifiers 200. Each service zone is fed by an optical link from the source 202 or headend. The number of cascaded trunk amplifiers 200 after the optical receiver is limited to 4–8. Therefore, because of the decreased number of cascaded number of amplifiers 200 and the high-quality, directly modulated optical fiber system, the received video quality can be improved. Locally originating program 204 forms an input to the source 202. Terrestial microwave 206 and terrestial broadcast 208 including satellite transmission 210 are outputs of the source. The node 212 includes the FM-IM converter of the present invention and a detector. This system upgrade of using fiber-backbone 214 can be much more economical than completely rebuilding a new optical-fiber system.

Figure 13B:
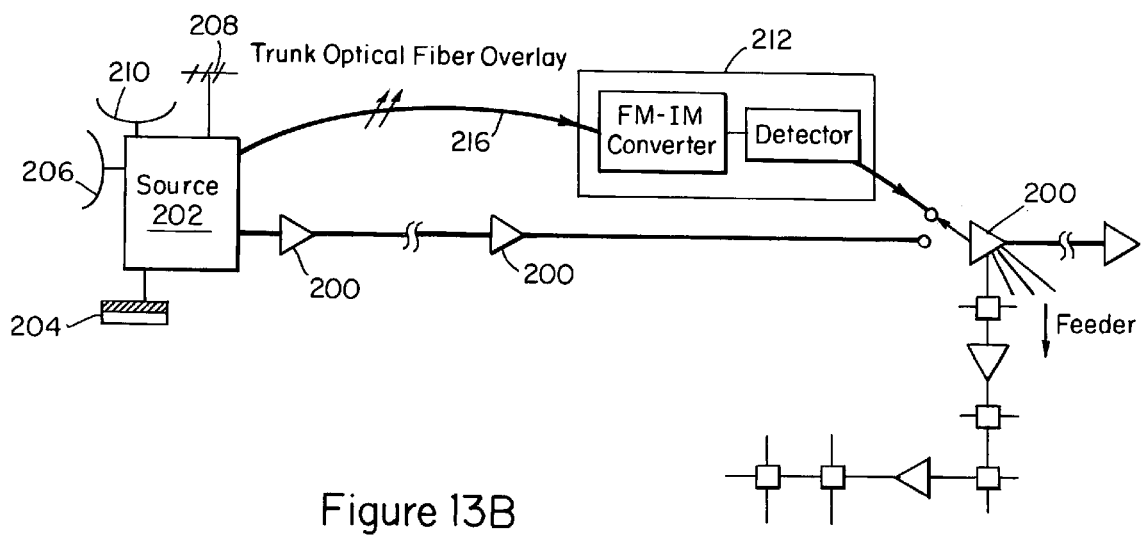

Referring to FIG. 13B, another system using optical fibers is a fiber-overlay system using optical fibers. Networks with optical fiber overlay use the original trunk amplifiers 200 as a backup in case the optical fiber system 216 fails. All trunk amplifiers 200 remain in the forward direction, and are not reversed as in the fiber-backbone architecture. Each optical node 212 serves more than 1000 customers. The optical node includes the FM-IM converter of the present invention. There is a sensing switch in each optical receiver. If the switch senses that the optical signal is lost, it will switch back to the original coaxial cable plant. By selecting a route for the fiber cable which does not duplicate the path of the coaxial trunk system, the chance of both cables being cut at the same time is dramatically reduced.

Figure 13C:
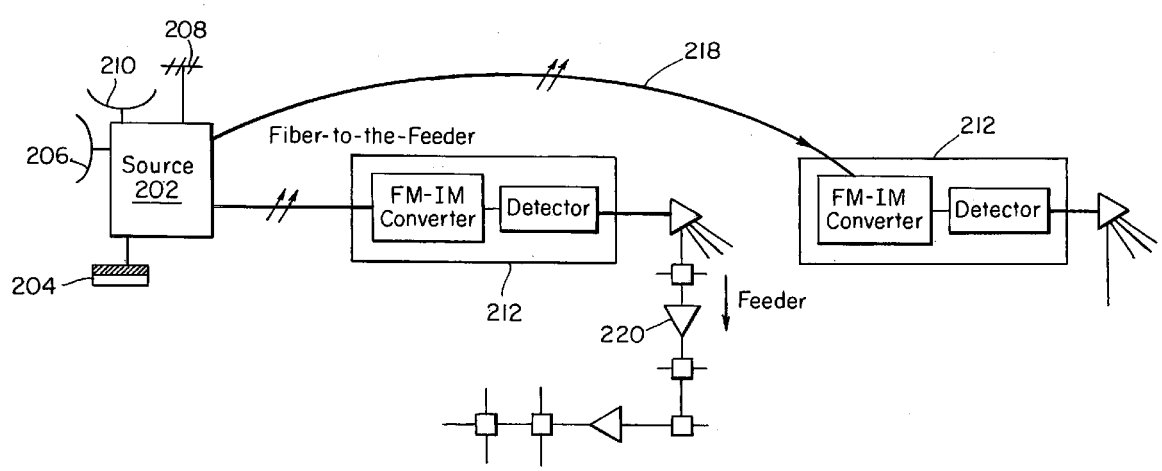

Referring to FIG. 13C, for cable systems that are degraded to a point that the cables and the amplifiers cannot be reused, the following advanced architecture or system may be used. The fiber-to-the-feeder architecture has a fiber link 218 to each service area where 300 to 500 customers are served. The output of the optical receiver 212 provides four outputs with the same voltage levels as a bridger amplifier. Conventional feeder line amplifiers 220 or distribution amplifiers are used to increase the area which can be fed by a given node 212 (no large trunk cables or trunk amplifiers are used in this architecture). The node 212 includes the FM-IM converter of the present invention. The number of cascaded feeder amplifers is limited to three or four; therefore, very good picture quality and system reliability can be achieved. Another important factor to consider is that lower-quality, directly modulated laser transmitters and receivers can be used because the number of cascaded amplifiers after the optical node is limited to fewer than four. This gives great potential for cost savings.

Figure 13D:
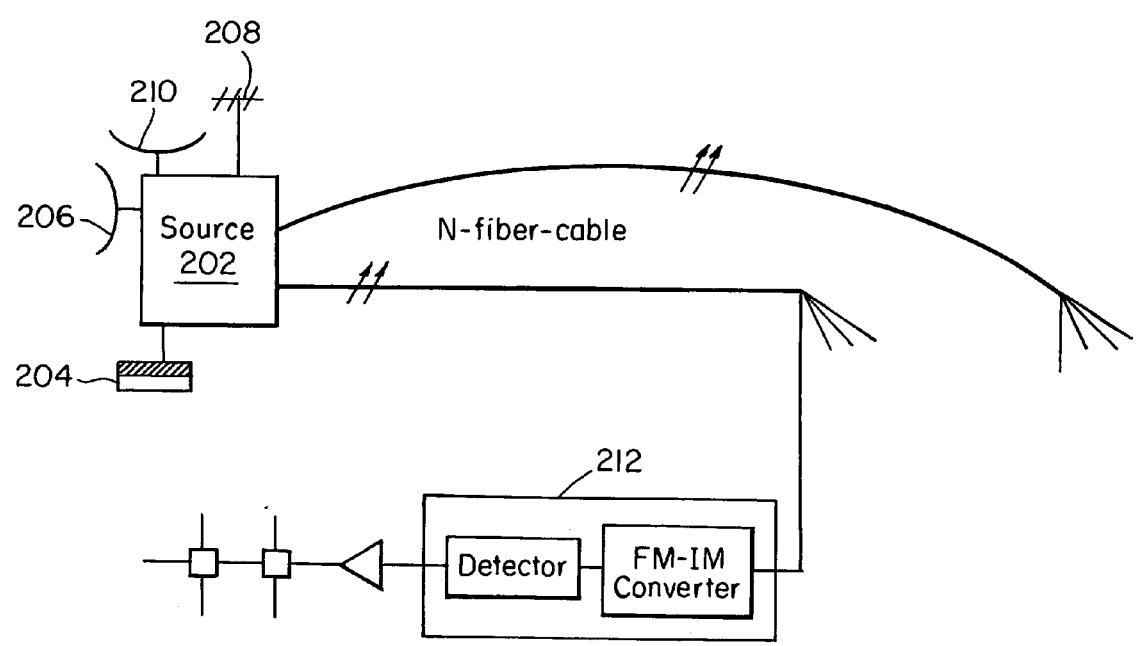

Referring to FIG. 13D, the passive fiber coax (fiber-to-the-line extender and fiber to the tap) architecture does not use any active components after the optical node 212, hence the name "passive fiber coax." The optical node 212 includes the FM-IM converter of the present invention. The number of customers who can be served is around 50–100 for the former, and around 4–8 for the latter. For fiber penetration to such a deep level, both signal quality and reliability may be excellent, but the cost may surely be increased even though we can use an even lower grade of AM laser transmitters and receivers.

Referring again to FIG. 12D, ring architecture in the subscriber loop for hybrid fiber coax (HFC) systems can be a more reliable and economical alternative to the passive fiber coax networks. Each optical node 150 has an optical receiver with a 1×2 optical switch at the input. Once a "loss of signal" is detected in the active fiber ring, the switch automatically turns to the standby fiber ring. All optical nodes may continue to receive signals from the CATV headend 162. This kind of architecture requires a transmitter with much higher-output optical power, because of the higher power budget needed for longer distance transmission and for power splitting along the ring.

Figure 14A:
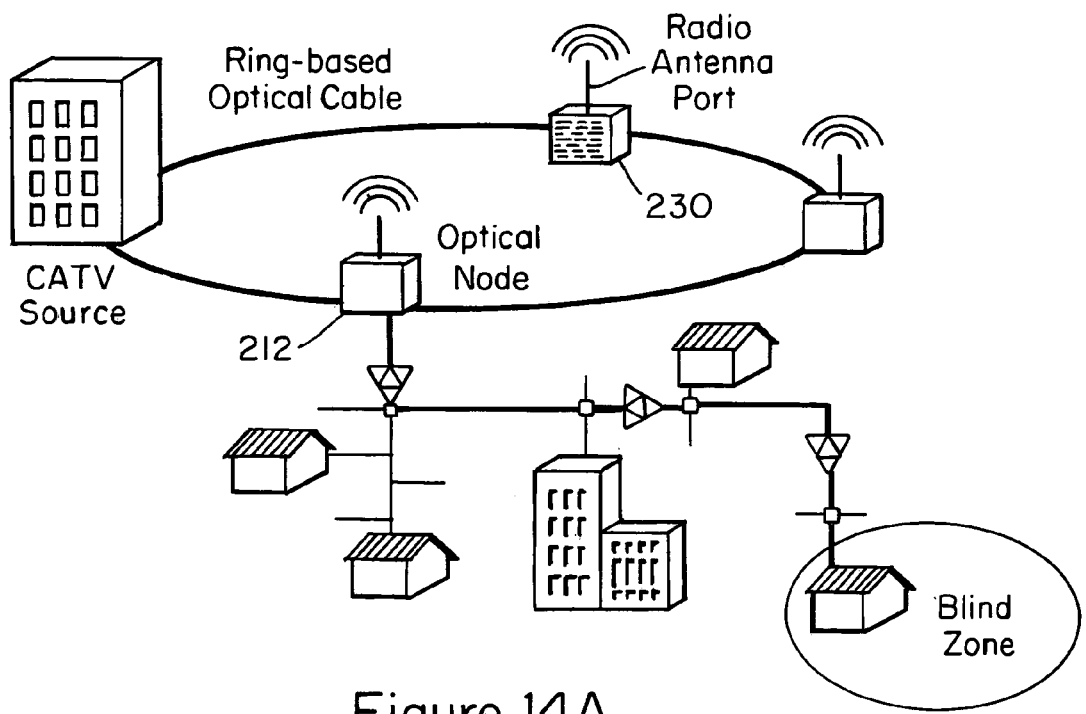
FIGS. 14A and 14B are schematic diagrams of hybrid fiber coaxial networks including the optical frequency filter in accordance with the present invention.
Figure 14B:
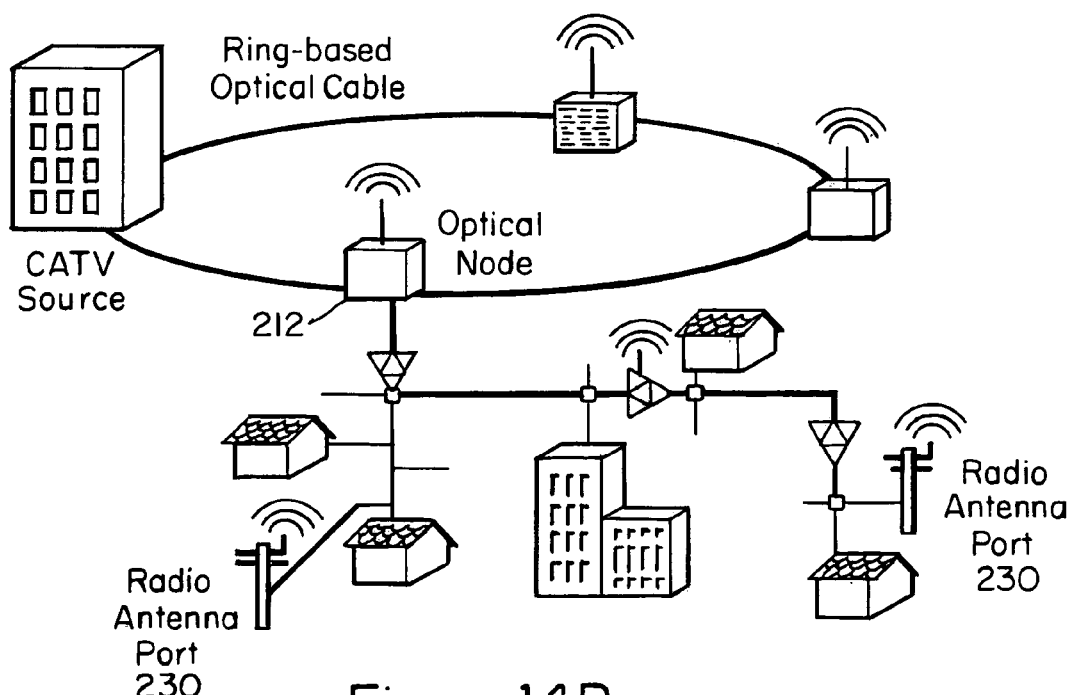

Referring to FIGS. 14A and 14B, in an existing HFC system, each optical node 212 may be serving a large number of subscribers (e.g., 2000 to 5000), which is far larger than the targeted 200 to 500 subscribers per optical node. A radio port antenna 230 must be installed on top of a high building to increase the coverage. The problem is that the antenna 230 may be some distance away from the optical node 212 that is usually located between utility poles or inside a hub. Another problem with such a large service area per optical node is that the dynamic range requirement on the return-path laser becomes very high. To cope with this transitional stage problem, an alternative location as illustrated in FIG. 14B for the radio antenna port 230 installation is along the coaxial trunk/feeder lines of an HFC system.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An optical frequency filter comprising:
   a frequency dependent disperser that disperses a frequency modulated input optical signal to form a dispersed signal having a plurality of frequencies;
   a modulator that modulates at least one of the dispersed plurality of frequencies to generate a spatially mapped, dispersed signal;
   a frequency dependent combiner that combines the frequencies in the dispersed signal to form an intensity modulated output signal,
   the output signal having a transmitted power of light through the optical frequency filter that is a monotonically varying function with respect to frequency over a selected bandwidth.

2. The optical frequency filter of claim 1, wherein the transmission of light through the filter is linear as a function of frequency over the selected bandwidth.

3. The optical frequency filter of claim 1, wherein the modulation of light depends on time.

4. The optical frequency filter of claim 1, further comprising a circulator that is optically coupled to an input optical waveguide and the disperser.

5. The optical frequency filter of claim 1, wherein the frequency dependent disperser comprises a device having time delays which depend on frequency.

6. The optical frequency filter of claim 5, wherein the disperser comprises a fiber grating having a Bragg frequency that is an exponential function of position.

7. The optical frequency filter of claim 1, wherein the modulator and the combiner comprise a grating.

8. The optical frequency filter of claim 1, wherein the frequency dependent disperser comprises a device having a plurality of one of positions and angles which depend on frequency.

9. The optical frequency filter of claim 1, wherein the frequency dependent disperser comprises a diffraction grating.

10. The optical frequency filter of claim 1, wherein the frequency dependent disperser comprises a prism.

11. The optical frequency filter of claim 1, wherein the frequency dependent disperser comprises an array of waveguide gratings.

12. The optical frequency filter of claim 1, wherein the frequency dependent disperser comprises a modified waveguide grating router.

13. An optical frequency filter comprising:
a frequency dependent disperser that disperses a frequency modulated input optical signal to form a dispersed signal having a plurality of frequencies;
an attenuator that modulates at least one of the dispersed plurality of frequencies; and
a frequency dependent combiner that combines the frequencies in the dispersed signal to generate an intensity modulated output signal, the output signal having a transmitted power of light through the frequency filter that is a monotonically varying function with respect to frequency over a selected bandwidth.

14. In an optical communications network, a frequency modulation (FM) to intensity modulation (IM) converter comprising:
a frequency dependent disperser that disperses a frequency modulated light signal into a plurality of frequencies;
a modulator that modulates at least one of the plurality of frequencies to generate a spatially mapped, dispersed signal; and
a frequency dependent combiner that combines the frequencies in the dispersed signal to form an intensity modulated output signal, the output signal being transmitted through the converter comprising a monotonically varying function with respect to frequency over a selected bandwidth.

15. The converter of claim 14 wherein transmission of light through the converter is linear as a function of frequency over the selected bandwidth.

16. The converter of claim 14 further comprising an input optical fiber, a fiber grating and an output optical fiber.

17. The converter of claim 14 wherein the disperser and combiner comprises a fiber grating.

18. The converter of claim 16 wherein the modulator is coupled to at least one of the disperser and combiner.

19. The converter of claim 14 further comprising a fiber grating and at least one device that allows light to propagate in a predetermined direction.

20. The converter of claim 19 wherein the device that allows light to propagate in a predetermined direction further comprises at least one circulator, the circulator being coupled to the disperser and the combiner.

21. The converter of claim 14 further comprising a mirror and a grating that forms the disperser and the combiner such that the mirror reflects the dispersed light from the grating onto the grating.

22. The converter of claim 21, wherein the mirror is disposed at an angle with respect to the grating such that the referenced, dispersed light is offset from the frequency modulated light signal which forms the input to the converter.

23. The converter of claim 21, wherein the grating comprises a waveguide grating router.

24. The converter of claim 21, wherein the grating comprises a diffraction grating.

25. An optical communication system comprising:
an optical FM source operating in communication with a transmitter, the source being further capable of outputting a FM optical signal;
an optical transmission link for carrying the FM optical signal to a receiver;
a FM to IM converter in communication with the receiver, the converter including a frequency dependent disperser to disperse light associated with the FM optical signal such that a plurality of frequencies are coupled to a modulator that modulates an intensity of one or more frequencies to generate a spatially mapped, dispersed signal and a frequency dependent combiner to produce an IM output signal that is linear with frequency over a selected bandwidth; and
a detector to detect IM signals.

26. A method to convert input FM optical signals to IM optical output signals, comprising the steps of:
dispersing an FM input optical signal using a frequency dependent disperser to form a dispersed optical signal having a plurality of frequencies;
modulating the dispersed optical signal using a modulator that spatially maps and alters a magnitude of one of the plurality of frequencies; and
combining the dispersed optical signal using a frequency dependent combiner to form an intensity modulated output signal, the intensity modulated output signal comprising a monotonically varying function with respect to frequency over a selected bandwidth.

27. The method of claim 26, wherein the intensity modulated output signal is linear with frequency over a selected bandwidth.

28. The method of claim 26, providing a frequency dependent modulator that modulates the dispersed frequencies as a function of spatial position such that the modulated output signal is linear with frequency.

29. A method of filtering a received optical signal comprising the steps of:
dispersing a frequency modulated input optical signal using a frequency dependent disperser to form a dispersed optical signal having a plurality of frequencies;
modulating the dispersed optical signal using a modulator that modulates one of the plurality of frequencies using spatial mapping; and
combining the optical signal using a frequency dependent combiner to form an IM output signal that monotonically varies with frequency over a selected bandwidth.

30. The method of claim 29 further comprising collecting the input optical signal from a sample and forming a spectrum with the output signal.

31. A method of filtering a received optical signal comprising the steps of:

forming a plurality of filters in series or parallel, each filter having a disperser, an attenuator and a combiner and comprising the steps of:

dispersing a frequency modulated input optical signal using a frequency dependent disperser to generate a dispersed optical signal having a plurality of frequencies;

modulating the dispersed optical signal using a spatial mapping modulator that modulates one of the plurality of frequencies; and combining the optical signal using a frequency dependent combiner to generate an intensity modulated output signal that monotonically varies with frequency over a selected bandwidth.

32. A method to shape the transmission of a an optical signal with respect to frequency comprising the steps of:

dispersing a frequency modulated input optical signal using a frequency dependent disperser to form a dispersed optical signal having a plurality of frequencies;

modulating the dispersed optical signal using a modulator that modulates at least one of the plurality of frequencies to generate a spatially mapped, dispersed signal; and combining the dispersed optical signal using a frequency dependent combiner to form an intensity modulated output signal that is linear with frequency over a selected bandwidth.

* * * * *